(12) United States Patent
Moore et al.

(10) Patent No.: US 6,835,910 B2
(45) Date of Patent: Dec. 28, 2004

(54) WELDING APPARATUS AND METHOD

(75) Inventors: Dean T. Moore, Strongsville, OH (US); David Flaherty, Cleveland, OH (US); Melissa A. Ing, Cuyahoga Falls, OH (US)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 10/351,677

(22) Filed: Jan. 27, 2003

(65) Prior Publication Data

US 2004/0003907 A1 Jan. 8, 2004

Related U.S. Application Data

(60) Provisional application No. 60/352,105, filed on Jan. 25, 2002.

(51) Int. Cl.[7] .................................................. B23K 9/00
(52) U.S. Cl. ................................ 219/121.45; 219/130.4
(58) Field of Search ........................ 219/121.46, 121.45, 219/121.36, 121.59, 121.52, 130.4, 121.11, 121.37, 121.39; 102/202.5, 202.6, 202.7; 266/167, 144; 228/33, 241

(56) References Cited

U.S. PATENT DOCUMENTS

| | | |
|---|---|---|
| 1,695,089 A | 12/1928 | Deppeler |
| 2,391,242 A | 12/1945 | Hurrey |
| 2,569,956 A | 10/1951 | Schiltknecht |
| 2,831,760 A | 4/1958 | Rejdak |
| 2,870,498 A | 1/1959 | Rejdak |
| 2,972,951 A | 2/1961 | Stresau |
| 3,020,610 A | 2/1962 | Rejdak |
| 3,054,349 A | 9/1962 | Plumley |
| 3,099,813 A | 7/1963 | Anderson |
| 3,298,306 A | 1/1967 | Purdy |
| 3,669,022 A | 6/1972 | Dahn et al. |
| 3,827,362 A | 8/1974 | Huggett |
| 3,955,505 A | 5/1976 | Jonston |

(List continued on next page.)

FOREIGN PATENT DOCUMENTS

| | | |
|---|---|---|
| DE | 1279821 | 10/1968 |
| EP | 120176 | 10/1984 |
| EP | 0 164 313 | 12/1985 |
| EP | 875330 | 11/1998 |
| FR | 324534 | 7/2002 |
| GB | 28041 | 10/1905 |
| WO | 99/61194 | 12/1999 |

OTHER PUBLICATIONS

International Search Report for International Application No. PCT/US03/02428, filing date Jan., 2003.

(List continued on next page.)

*Primary Examiner*—Tu Hoang
(74) *Attorney, Agent, or Firm*—Renner, Otto, Boisselle & Sklar, LLP

(57) ABSTRACT

A self-contained crucible assembly for forming a weld between a pair of metal articles, includes a container with side walls and a fusible bottom, a refractory material lining the side walls, an exothermic weld material within the container, an ignitor partially within or close to the weld material and partially external to the container, and a cover sealing the weld material. The ignitor may be stiffened to maintain its shape, and keep it in a desired position relative to the exothermic weld material. The crucible assembly is configured to be placed on mold having a chamber therein. Upon ignition of the weld material via actuation of the ignitor, the weld material reacts exothermically to produce molten weld metal and slag. The fusible bottom of the container is melted by the liquified molten metal, and the weld material flows into a weld chamber of the mold to produce the weld.

75 Claims, 7 Drawing Sheets

U.S. PATENT DOCUMENTS

| | | | |
|---|---|---|---|
| 3,961,579 | A | 6/1976 | Faber et al. |
| 4,062,485 | A | 12/1977 | Andersen |
| 4,182,947 | A | 1/1980 | Brower |
| 4,216,721 | A | 8/1980 | Marziano et al. |
| 4,334,474 | A | 6/1982 | Coltharp |
| 4,424,086 | A | 1/1984 | Christopher |
| 4,471,697 | A | 9/1984 | McCormick et al. |
| 4,690,056 | A | 9/1987 | Brede et al. |
| H464 | H | 5/1988 | Lee et al. |
| 4,879,452 | A | 11/1989 | Kovarik et al. |
| 4,879,952 | A | 11/1989 | Dowing et al. |
| 4,881,677 | A | 11/1989 | Amos et al. |
| 4,885,452 | A | 12/1989 | Amos et al. |
| 4,889,324 | A | 12/1989 | Brosnan et al. |
| 4,938,137 | A | 7/1990 | Guay |
| 5,052,301 | A | 10/1991 | Walker |
| 5,090,322 | A | 2/1992 | Allford |
| 5,145,106 | A | 9/1992 | Moore et al. |
| 5,151,202 | A | 9/1992 | Bommart |
| 5,153,986 | A | 10/1992 | Brauer et al. |
| 5,275,106 | A | 1/1994 | Cutting et al. |
| 5,479,860 | A | 1/1996 | Ellis |
| 5,533,662 | A | 7/1996 | Stidham et al. |
| 5,538,795 | A | 7/1996 | Barbee, Jr. et al. |
| 5,715,886 | A | 2/1998 | Fuchs |
| 6,553,911 | B1 * | 4/2003 | Walker et al. ............ 102/202.7 |
| 6,703,578 | B2 * | 3/2004 | Walker et al. ......... 219/121.45 |

OTHER PUBLICATIONS

"Electroplated wire and ribbon." by Sigmund Cohn Corp., Apr. 1985.

"Exothermic Connections" by ERICO, Inc., 1993, published in Cadweld News vol. II, No. 1.

"Cadweld Connections and Related Products Trade Net Price Book" by ERICO, Mar. 1996, pp. 6 and 7.

"ThermOweld Low Emmission Electrical Connections" by thermOweld, Mar. 1, 1996.

"General Discussion of Pyrofuze" by Pyrofuze Corp. affiliate of Sigmund Cohn Corp. (not dated).

"Exothermic Reactions and Methods," by Walker, et al., U.S. Appl. No. 08/846,285, filed Apr. 30, 1997.

* cited by examiner

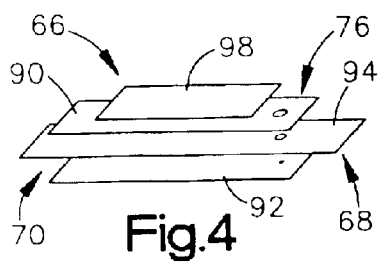
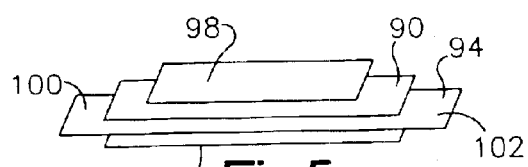
Fig.4
Fig.5
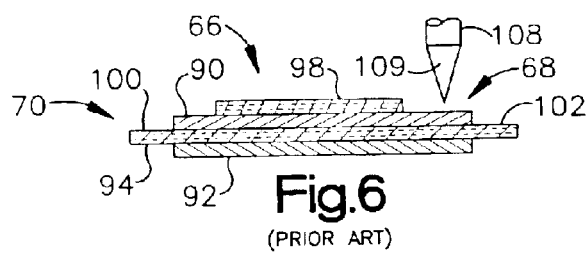
Fig.6
(PRIOR ART)
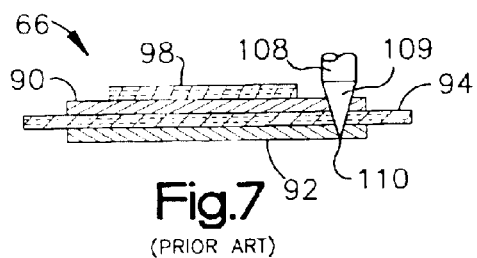
Fig.7
(PRIOR ART)
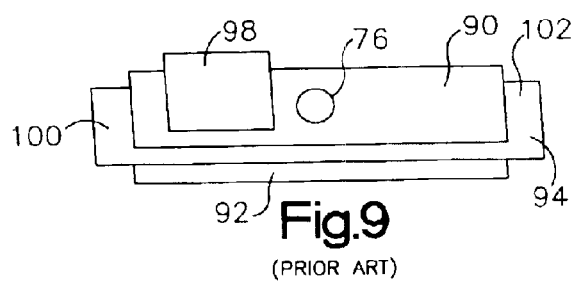
Fig.9
(PRIOR ART)
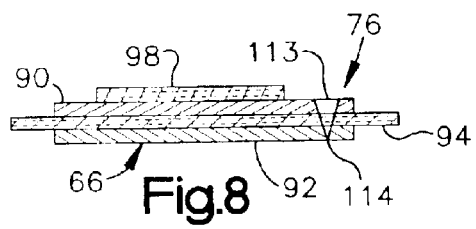
Fig.8
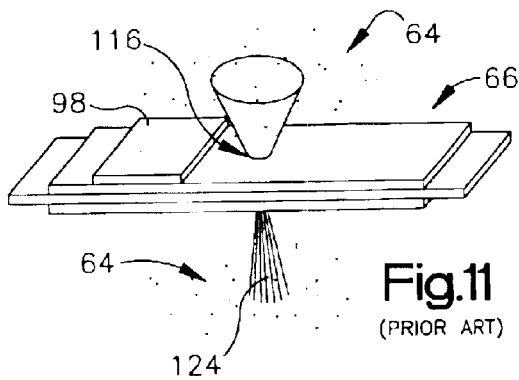
Fig.11
(PRIOR ART)
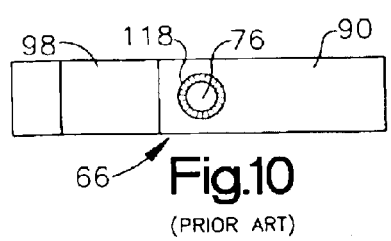
Fig.10
(PRIOR ART)
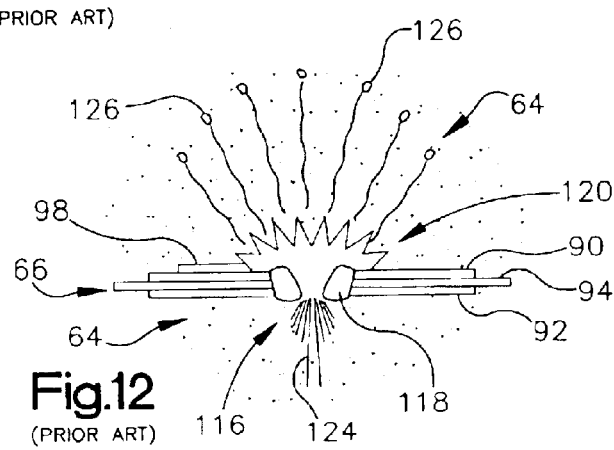
Fig.12
(PRIOR ART)

WELDING APPARATUS AND METHOD

This application claims priority from U.S. Provisional Application No. 60/352,105, filed Jan. 25, 2002, which is hereby incorporated by reference in its entirety.

BACKGROUND OF THE INVENTION

1. Technical Field of the Invention

This invention relates generally to welding apparatus and methods, and more particularly to apparatus and methods for forming weld connections, and for initiating self propagating exothermic reactions, such as in the process of forming the weld connections.

2. Description of the Related Art

Exothermic welding has become recognized as a preferred way to form top quality high ampacity, low resistance electrical connections.

Exothermic welded connections are immune to thermal conditions which can cause mechanical and compression joints to become loose or corrode. They are recognized for their durability and longevity. The process fuses together the parts or conductors to provide a molecular bond, with a current carrying capacity equal to that of the conductor. Such connections are widely used in grounding systems enabling the system to operate as a continuous conductor with lower resistivity.

Examples of self propagating exothermic reactions for exothermic welding are found in the CADWELD® process and the Thermit® process. CADWELD® is a trademark of Erico International Corporation, Solon, Ohio, U.S.A., and Thermit® is a trademark of Th. Goldschmidt A G, Essex, Germany. Exothermic mixtures are basically a combination of a reductant metal and usually a transition metal oxide. An example is aluminum and copper oxide which upon ignition supplies enough heat to propagate and sustain a reaction within the mixture. It is usually the molten metal product or the heat of this reaction which is then used to produce a desired result. The CADWELD® process produces, for example, a mixture of molten copper and aluminum oxide or slag. The molten copper has a higher density than the slag and is usually directed by a mold to join or weld copper to copper or steel to steel. The aluminum oxide slag is removed from the weld connection and discarded. Another common mixture is iron oxide and aluminum. Where only the heat of the reaction is used, the heat may be used to fuze brazing material, for example.

The exothermic reaction produces a large amount of heat. The most common way to contain the reaction, and to produce the weld or joint, has been to contain the reaction in a split graphite mold. A prior art welding apparatus 10 utilizing such a split graphite mold 12 is shown in FIG. 1. Referring to FIG. 1, the mold 12 includes an upper mold body section 14, a lower mold body section 16, and a mold cover 20. The conductors or items to be joined, such as the bars 22 and 24, are thoroughly cleaned and then placed in the appropriate location to project into a weld chamber 26 defined by the body sections 14 and 16 of the mold 12. The upper mold body section 14 includes a crucible chamber 30 above the weld chamber 26, connected to the weld chamber 26 by a tap hole 32. The mold body sections 14 and 16 are then securely closed and locked usually with a toggle clamp, and a metal disk 34 is positioned in the crucible chamber 30 over a tap hole 32. An appropriate amount of exothermic material 36 is emptied into the crucible chamber 30 on top of the disk 34, and a traditional starting powder or material 40 is sprinkled over the top of the exothermic welding material 36. The starting powder 40 is essentially a much finer exothermic material. The mold cover 20 is then closed and the reaction initiated by igniting the starting powder 40 by the use of a flint ignitor.

The starting powder or material 40 sprinkled on top of the exothermic material 36 has a lower ignition temperature and is easily ignited by the flint gun while the flint gun cannot normally ignite the exothermic material 36 directly. When the exothermic material 36 is ignited, the molten metal phase separates from the slag and melts through the metal disk 34. The molten metal then is directed via the tap hole 32 to the weld chamber and the conductors 22 and 24 to be joined. Once the metal has solidified the mold body sections 14 and 16 are opened and the slag is separated from the weld connection. The mold 12 is cleaned and readied for reuse for the next connection.

As suggested by the above, exothermic mixtures of this type do not react spontaneously and need a method of initiating the reaction. This initiation method involves generating enough localized energy to enable the reaction to begin. One method of initiating ignition is that described above, use of a starting powder and an ignition source such as a flint igniter. However, because of the starting powder's low ignition temperature and deficiencies in handling and shipping, much effort has been made to find a reliable and low cost alternative ignition system for the exothermic material. A number of electrical systems have been devised which range from simple spark gaps to bridge wires or foils, to much more esoteric devices such as rocket ignitors. Such efforts are seen, for example, in prior U.S. Pat. Nos. 4,881, 677, 4,879,952, 4,885,452, 4,889,324 and 5,145,106. For a variety of reasons, but primarily because of power requirements, dependability, and cost, such devices have not succeeded in replacing the standard starting powder/flint gun form of initiating the self propagating exothermic reactions. Another electrical ignition system is the system disclosed in European Patent Publication No. 875 330, owned by the assignee of this application, which is incorporated herein by reference in its entirety.

In addition, there are other difficulties inherent with the welding apparatus and method described above. Aside from the difficulties in handling and shipping the starting powder 40, there may be problems in handling and shipping the bulk exothermic material 36 itself. Properly measuring the exothermic material 36 may be both time consuming and susceptible to error. Further, he graphite molds utilized in prior art apparatuses, such as the mold 12 utilized in the welding apparatus 10 shown in FIG. 1, may be costly because of the amount of graphite involved, and because of the amount of machining need to produce the passages shown in the mold 12 of FIG. 1. Finally, a process such as that described above produces undesirable residues on surfaces of the mold 12. The residues require periodic cleaning of the surfaces of the mold 12, a labor-intensive process. Even with periodic cleaning, the formation of the residues may reduce the operational life of the mold 12. Finally, the cleaning itself may cause damage to the mold, also leading to reduced operation life of the mold 12.

Accordingly, it will be appreciated that improved welding apparatus and methods would be desirable.

SUMMARY OF THE INVENTION

According to an aspect of the invention, a self-contained crucible assembly includes a container having side walls and a fusible bottom; a refractory material lining the side walls of the container; an exothermic weld material within the container; and an ignitor extending into the container for igniting the exothermic material.

According to another aspect of the invention, an ignitor for weld metal material includes first and second metal strips and an insulating material between the first and second metal strips. The first metal strip has a perforation therein operative to create a spark plasma emanating from the perforation when a voltage is applied to the first metal strip. The second strip is stiffer than the first strip.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 4 is a schematic illustration of an ignitor according to the present invention, usable as part of the crucible assembly of FIG. 2;

FIG. 5 is a schematic illustration of the metal foil strips of the ignitor being assembled with the insulation therebetween prior to the punching and shaping of the hole;

FIG. 6 is a schematic edge elevation illustration showing the conical tip punch about to enter the ignitor;

FIG. 7 is a similar schematic illustration showing the punch forming the hole;

FIG. 8 is a similar schematic illustration showing the shaped hole formed;

FIG. 9 is a schematic illustration of an ignitor with the hole more centrally positioned;

FIG. 10 is a schematic illustration of the fusion which takes place around the hole in an intermediate phase of the ignition;

FIG. 11 is a schematic illustration of the spark plasma energy created showing the conical shape of the energy plasma on one side and the venting plasma on the other;

FIG. 12 is another somewhat larger view showing the shape of the spark plasma, the venting plasma and the fusion taking place, all immersed in an exothermic reaction mixture;

DETAILED DESCRIPTION

A self-contained crucible assembly provides an efficient and cost-effective way of forming a weld between a pair of metal articles. The self-contained crucible assembly includes a container with side walls and a fusible bottom, a refractory material lining the side walls, an exothermic weld material within the container, an ignitor partially within or close to the weld material and partially external to the container, and a cover sealing the weld material. The ignitor may be stiffened to maintain its shape, and keep it in position partially within or close to the exothermic weld material. The crucible assembly is configured to be placed on mold having a chamber therein. Upon ignition of the weld material via actuation of the ignitor, the weld material reacts exothermically to produce molten weld metal and slag. The refractory material lining the side walls prevents the side walls of the container from rupturing. Instead, the fusible bottom of the container is melted by the liquified molten metal, and the weld material flows into a weld chamber of the mold to produce the weld.

The refractory material may include graphite, and may be a coating adhered to the side walls or may be a separate liner placed inside the side walls. Alternatively, the refractory material may itself be the side walls of the container.

The crucible assembly provides many advantages over prior weld formation apparatuses and methods. First of all, the self-contained crucible assembly provides a pre-measured amount of weld material for formation of the weld. Second, the weld material is sealed within the container, discourages ingress of moisture or other contaminants that may adversely affect the properties of the weld material, and allowing weld material to be safely stored and handled. Third, the container of the crucible assembly may be disposed of after use, avoiding the need to perform the time-consuming task of cleaning a mold covered with residues. Fourth, the crucible assembly may be flexible, configured to be used with either existing molds, or with simplified, less-expensive molds, requiring less material and less machining.

Figure 2:
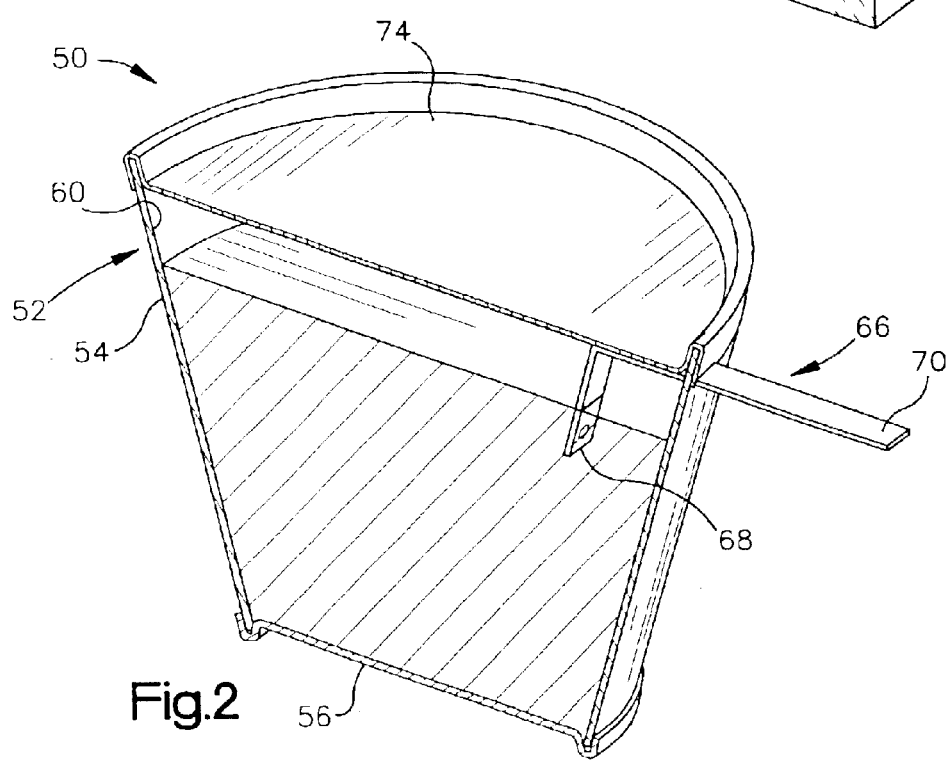
FIG. 2 is a cutaway isometric illustration of a crucible assembly according to the present invention.
Figure 3:
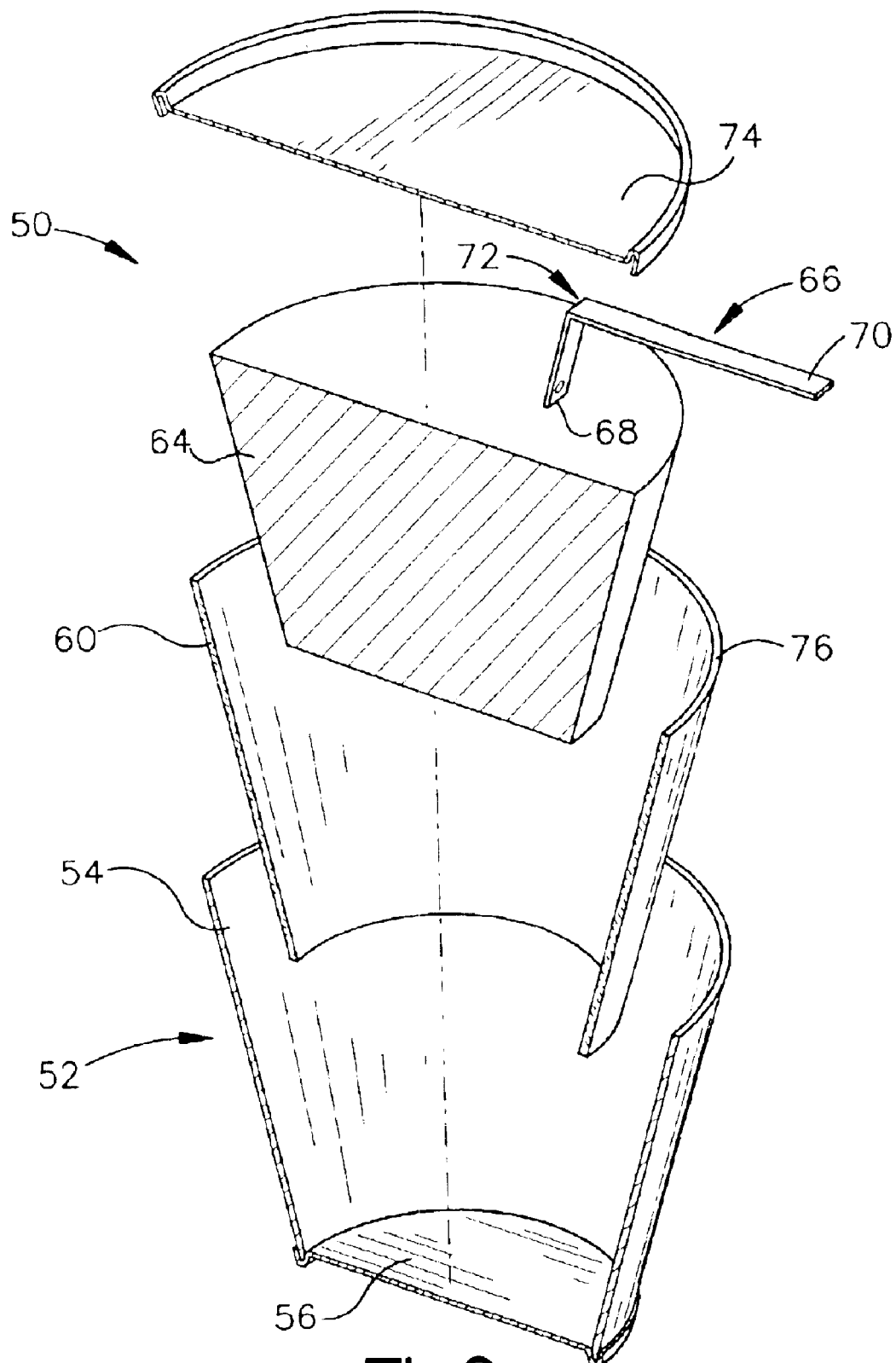
FIG. 3 is an exploded view of the crucible assembly of FIG. 2.

Referring to FIGS. 2 and 3, a crucible assembly 50 is shown. The crucible assembly 50 includes a container 52 with side walls 54 and a fusible bottom 56. A refractory material 60 lines the side walls 54 of the container 52. The refractory material 60 protects the side walls 54 from the heat generated by an exothermic weld material 64 that is within the container 52. An ignitor 66 has a first end 68 situated above or partially within the weld material 64, and a second end 70 protruding from the container 52. The ignitor 66 has a bend 72 therein to facilitate proper placement or positioning of the ends 68 and 70 of the ignitor 66. The bend may be a relatively sharp bend, such as a substantially right-angle bend. A cover 74 engages a top edge 76 of the container 52, sealing the weld material 64 and the first end 68 of the ignitor 66 within the container 52. The second end 70 of the ignitor 66 protrudes from the container 52 from between the cover 74 and the top edge 76 of the container 52. The ignitor 66 may attached, for example with a suitable adhesive, to an underside of the cover 74.

The cover 74 prevents the weld material 64 from leaving the container 52 prior to initiation of a reaction to form a weld connection. The cover 74 thus maintains a predetermined amount of the weld material 64 in the container 52 during shipment, handling, and installation of the crucible assembly 50. Further, the cover 74 prevents ingress of dirt, moisture, or other contaminants into the container 52, and in particular into the weld material 64. Such contaminants could adversely affect performance of the weld material 64, for example altering the reaction characteristics of the weld material 64, or introducing contaminants into the weld connection produced by the weld material 64.

The ignitor 66 provides a means of initiating a reaction in the weld material 64, without removing the cover 74. As described in greater detail below, the ignitor 66 may be an electrical ignitor, configured such that an electrical connector may be connected to the second end 70 of the ignitor 66, to provide a charge that initiates a reaction of the weld material 64 in the vicinity of the first end 68 of the ignitor 66. Toward that end, the ignitor 66 has a conical punched hole 76 at its first end 68, the function and formation of which are described below.

Figure 1:
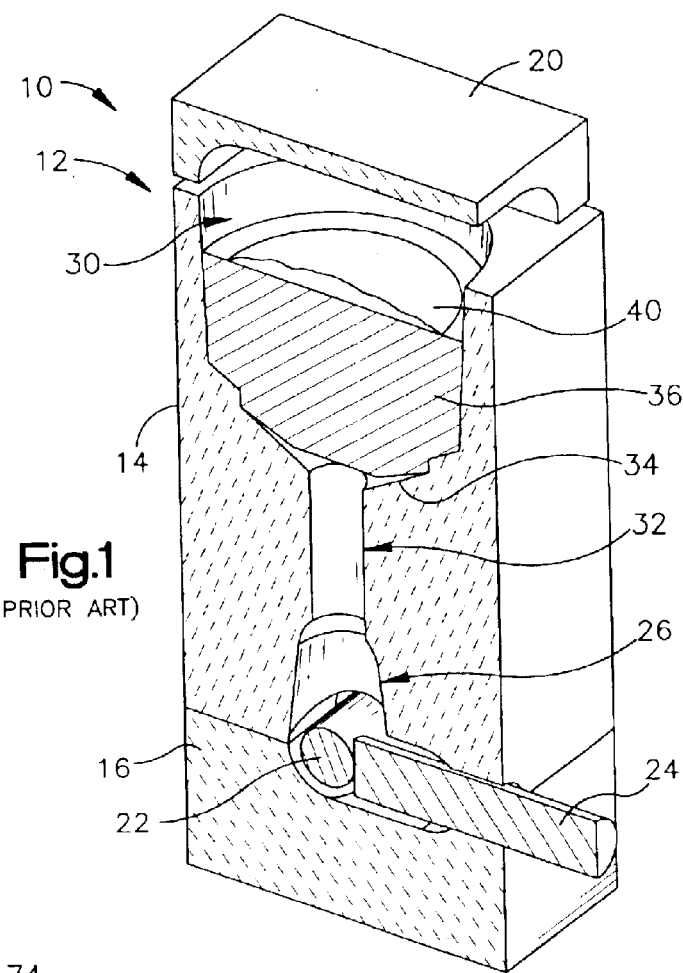
FIG. 1 is a cutaway isometric illustration of a prior art welding apparatus.

Reaction of the weld material 64 produces heat, as discussed above with regard to the welding apparatus 10 shown in FIG. 1. The refractory material 60 protects the side walls 54 of the container 52 from being ruptured, perforated, or from otherwise failing as a result of the heat produced by the reaction of the weld material 64. However, at least part of the fusible bottom 56 of the container 52 is not protected by the refractory material 60. The partially- or fully-reacted weld material 64 possesses sufficient heat to rupture and/or melt the fusible bottom 56, allowing the molten reacted weld material 64 (also referred to herein as "weld metal") to exit the container 52 to form a weld connection below the bottom 56 of the container 52.

The side walls 54 and the fusible bottom 56 may be formed from the same material, and may be formed as a single piece. For example, the side walls 54 and the bottom 56 of the container 52 may be a single, seamless piece of electro-tinned steel. The electro-tinned steel container 52 may be formed, for example, by drawing or by spinning.

Alternatively, the side walls 54 and the fusible bottom 56 may be separate pieces, and may be made of different materials. The fusible bottom 56 may be a steel disk. Alternatively, the fusible bottom 56 may be another suitable material that melts and/or ruptures to allow the reacted weld material 64 to pass therethrough. It will be appreciated that the material of the bottom 56 may be selected such that it does not introduce unacceptable contaminants into a weld connection produced as described above. The fusible bottom 56 may be secured to the side walls 54 by crimping or by another suitable method of attachment, for example by adhesive adhering, along a bottom edge 80 of the side walls 54. The side walls 54 of the container 52 may be any of a variety of suitable materials, for example suitable metals and metal alloys, ceramics, fiberglass, sand, or wax. The side walls may be a disposable material, for example cardboard, paper, or other paper pulp products.

The side walls 54 of the container 52 may include a conical surface, as is shown in FIGS. 2 and 3. The conical surface of the side walls 54 may help to focus the direction of the flow of the molten weld metal produced by the reaction of the weld material 64. Alternatively, the side walls 54 may have another suitable shape, such as a cylindrical shape.

The refractory material 60 may be a liner of graphite foil. The graphite foil may have a thickness of at least about 10 mils, and may have a thickness of about 15 mils. Suitable graphite foil is manufactured by UCAR International Inc. and is sold under the trademark GRAFOIL. Suitable graphite foil may be obtained from EGC Enterprises Incorp., of Chardon, Ohio. Alternatively, the refractory material may be another material that suitably protects the side walls 54 of the container.

The exothermic weld material 64 may be any of a variety of suitable weld materials, such as a powderized combination of a reductant metal and a transition metal oxide.

The cover 74 may be a metal foil cover, such as a metallized plastic film. An example of such a file is aluminized MYLAR. The metallized plastic film may have a thickness of about 0.5 mils to about 2 mils. The material, thickness, and configuration of the cover 74 may be selected such that the cover 74 provides a good seal for the container 52, while allowing release of pressure during reaction of the weld material 64. If the cover 74 were to maintain its integrity and its seal against the top edge 76 of the side walls 54 throughout the reaction of the weld material 64, pressure build-up in the space between the weld material 64 and the cover 74 may drive the molten weld material 64 downward with force. Such downward driving of the reacted weld material may cause poor results, for example driving slag material as well as metal into the resulting weld connection. To avoid such a situation, the cover 74 may be configured to burst during the reaction of the weld material 64, limiting the amount of pressure build-up that can occur within the container 52. Alternatively or in addition, the seal between the cover 74 and the top edge 76 of the sidewalls 54 may be configured to rupture in whole or in part during the reaction of the weld material 64, thereby preventing excessive pressure build-up in the container 52.

Other alternatives may be utilized to avoid undesired pressure build-up in the container 52 during the reaction of the weld material 64. For example, the cover 74 might be perforated or removed prior to initiation of the reaction, although it will be appreciated that this would compromise product integrity and make use of the product more complicated and time consuming. It is also possible that in some situations pressure build-up from the reaction of the weld material 64 may not be a problem, and configuration and handling of the cover 74 in such situations need not take into account the potential problems related to pressure build-up in the container 52.

As stated above, the cover 74 may be a metallized plastic film, for example an aluminized MYLAR. Alternatively, the cover 74 may be any of a variety of other suitable materials, such as including suitable metal foils, plastics, screens, and/or ceramic fibers, or combinations of these materials. As another alternative, the cover 74 may be or may include filter paper.

Turning now to FIG. 4, details of the ignitor 66 are shown. The ignitor 66 includes first and second conductive metal foil strips 90 and 92, separated by an intermediate layer of insulation 94. An additional insulation cover layer 98 is also part of the ignitor 66. The conical hole 76 at the first end 68 of the ignitor 66 provides a disruption that is used in initiating reaction of the weld material 64, once an electric charge is applied to the ignitor 66, as explained in greater detail below.

Since the ignitor 66 is normally going to be consumed in the exothermic reaction, it is important to select materials for the ignitor 66 which are compatible with the exothermic weld materials 64 (FIGS. 2 and 3). In the CADWELD process where copper conductors are being welded, one suitable metal foil material is copper. Another suitable metal foil material is steel. A suitable insulating material for the insulation layers 94 and 98 may be paper. It will be appreciated, however, that other metals or conductive foils may be employed together with other insulating material.

In order to provide stiffness to the ignitor 66, one of the metal foil strips 90 and 92 may be stiffer than the other of the strips. Thus, the second foil strip 92 may be stiffer than the first foil strip 90. The second foil strip 92 may be thicker than the first foil strip 90, and/or may be made of a different, stiffer material than the first foil strip 90. In a specific example, the first foil strip 90 is made of copper that may have a thickness from about 1 to about 3 mils, and may have a thickness from about 1.4 to about 2 mils. The second strip 92 is made of stainless steel that may have a thickness from about 5 to about 25 mils, may have a thickness from about 10 to about 15 mils, and may have a thickness of about 10 mils. The additional stiffness provided by use of a stiffer and/or thicker material for the second strip 92 aids in maintaining a desired shape and configuration for the ignitor 66 during manufacture, shipment, and storage, while maintaining desired ignition characteristics of the first strip 90. In particular, the additional stiffness helps maintain the bend 72 (FIG. 2) in the ignitor 66.

The intermediate layer of insulation 94 serves two purposes. It provides an insulating barrier between the two metal foil strips 90 and 92, and also provides a deflective barrier for both heat and energy once the ignitor 66 is fired or the reaction initiated. The foil strips 90 and 92 are joined to the intermediate insulating layer 94 by a minimal amount of conductive adhesive which may be placed on the interior of the foil strips 90 and 92. The adhesive enables the foil strips 90 and 92 to be firmly attached to the intermediate insulating layer 94 while eliminating air gaps, and the conductive nature of the adhesive enhances current flow lengthwise of the metal foil strips 90 and 92. The foil strips 90 and 92 and the insulation may be passed through the nip of rolls, for example, to ensure the proper adhesion and elimination of air gaps. The first foil strip 90 may be similarly adhered to the insulation cover layer 98. When the layers of the ignitor are assembled as seen in FIG. 5, the intermediate insulating layer 94 preferably projects slightly beyond the ends of the foil strips 90 and 92, such projections being shown at 100 and 102. The projections are shown somewhat exaggerated in the schematic illustrations and may be only a small fraction of an inch or a few millimeters or microns.

Once the ignitor 66 is assembled, as seen in FIGS. 6–8 a disruption is formed in the ignitor 66 to provide a source of energy discharge. This disruption is in the form of the conical hole 76 which is formed by punch 108 having a relatively sharp conical tip 109, or some other suitably-shaped tip. The process of forming a conical hole for an ignitor, shown in FIGS. 6–8, is described in European Patent Publication No. 875 330 and in co-pending U.S. application Ser. No. 08/846,285, and thus FIGS. 6–8 are labeled as prior art.

As seen in FIG. 7, the punch 108 enters the strip and the tip 109 projects through the strip assembly to project slightly from the other side as seen at 110. As seen in FIG. 8, when the punch 108 is withdrawn, there is formed the hole 76 in the strip ignitor 66, which has the conical configuration of the punch 108. The hole 76 on one side has a large end 113 and on the other side has a small or vent end 114. The hole 76 passes completely through the strip ignitor 66, and the hole 76 formed is shaped like a horn flaring to the large end 113.

The hole 76 is shown located at the first end 68 of the ignitor 66, although it will be appreciated that the hole 76 may be located at other suitable locations along the ignitor 66. For purposes of illustration, in FIGS. 9–12 the hole 76 is shown located in the center of the strip end-to-end and midway between the lateral or side edges. Also, as hereinafter described, more than one hole may be employed, and the size of the hole may vary. The hole illustrated is not to scale, and the diameter of the large end of the hole may vary from a fraction of a millimeter to about 2 millimeters (microns). The cone angle may also vary from that illustrated to obtain the conical or horn configuration which provides a shaped spark plasma. Being a punched perforation, the hole has characteristics of punching which distorts the linear nature of the assembly providing slightly folded or jagged edges and an attenuated insulation at the hole.

When the reaction is to be initiated and the ignitor 66 is fired, it is connected to a capacitor discharge unit, for example by coupling a suitable electrical connector onto the projecting second end 70 of the ignitor 66. Upon release of the capacitor energy, the initiation of the exothermic reaction occurs within milliseconds. Although the precise mechanics of the phenomena are not known, it is believed that the phenomena may be expressed by the following sequence of events, and as particularly illustrated in FIGS. 9–12. It is stressed that the ignition of the ignitor 66 may be other than shown in FIGS. 9–12. The sequence of events process of forming a conical hole for an ignitor, shown in FIGS. 9–12 and described below, is also described in European Patent Publication No. 875 330 and in co-pending U.S. application Ser. No. 08/846,285, and thus FIGS. 9–12 are labeled as prior art.

In the ignition sequence, the energy is released from the capacitor and into the two strips 90 and 92, each receiving one pole of the discharge, i.e. one negative and one positive.

The conical hole 76 through the strips 90 and 92 and the intermediate insulating layer 94 assembly acts as a disruption or a point of resistance and begins to heat rapidly; so rapidly, that there is essentially no time for the heat to dissipate to the surrounding materials. Eventually enough heat is available to cause a rapid melting of the entire thin 360° edge of the foil at the edge of the conical hole. This occurs according to $I^2R$ where I is the current push and R is the resistance. The molten edge in the intermediate phase as seen at 118 in FIGS. 10 and 12 increases the resistance thereby increasing the speed of further heating. The melting of the copper occurs at 1083° C.

The phenomena occurs in such a short time that the molten phase is unable to move, and the continued heating forces the molten copper to vaporize. This occurs for copper at in excess of 2571° C. The gas phase increases the resistance in the localized area even further.

The vapor begins to expand but continues to draw current until it begins to draw an electric arc. The arc or spark plasma may obtain temperatures in excess of 5000° C. The electric arc or spark forces the gas phase to a point of ionization which will begin to reduce the resistance very quickly which further increases the amount of current moving into the area.

The increase in current to the vapor region produces increased heating or super heat to the expanding vapor which forces the vapors to expand rapidly producing a resultant shock wave of spark plasma which is shown schematically as the top cone 120 in FIGS. 11 and 12. In FIGS. 11 and 12, the ignitor 66 is immersed in the exothermic weld material 64, which may be in granular form on both sides of the ignitor 66. The conical shock wave, however, expands with reduced force due to the presence of the smaller or vent hole in the other or opposite side of the ignitor 66. This vent or smaller end of the hole produces a somewhat smaller spark plasma seen at 124 reducing the extent and force of the shock wave cone 120 thus reducing the disturbance of any surrounding or close-by exothermic material 64 prior to the initiation of the reaction. A force too extensive and too sudden may literally remove or blow away some types of exothermic material from the heat of the spark plasma.

The shock wave carries molten copper 126 (FIG. 12) from the molten circumference 118 of the conical hole 76. The molten copper 126 spreads outwardly from the circumference of the conical hole while the vent hole provides the spark plasma 124 and the energy transfer in the opposite direction. The combination of the super heated vapor, the molten copper release in the shock wave, and the drawing of the electrical arc provide a substantial broadcast of energy and a multi-point ignition of the exothermic material 122.

Figure 13:
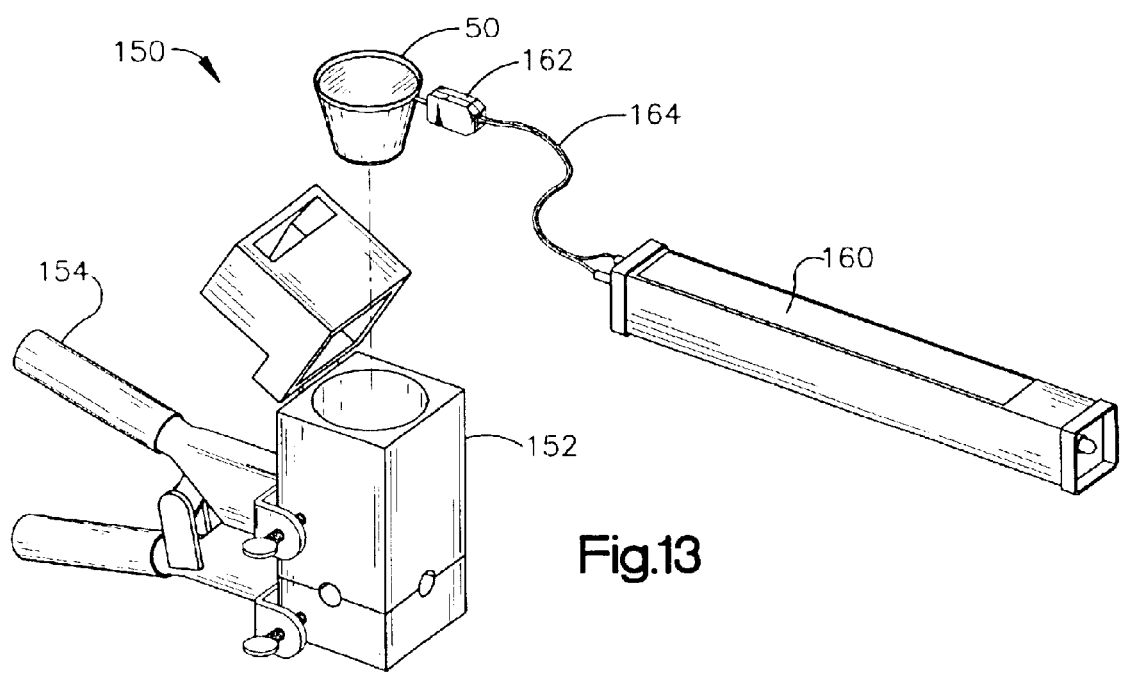
FIG. 13 is an illustration of the various components of a welding apparatus according to the present invention.

FIG. 13 shows the crucible assembly 50 as part of welding apparatus 150 that also includes a mold 152, a clamp 154 to hold parts of the mold 152 together, and a capacitor discharge unit 160 coupled to the second end 70 of the ignitor 66 via an electrical connector 162 and an electrical wire lead 164.

Figure 14:
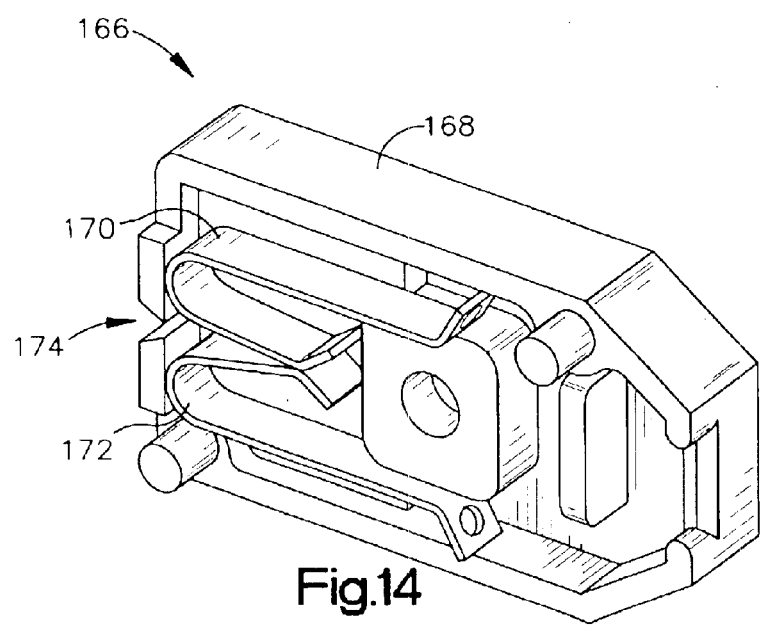
FIG. 14 is an isometric view of a part of an electrical connector that is part of the welding apparatus of FIG. 13.

Details of a part 166 of the electrical connector 162 are shown FIG. 14. The part 166 includes a plastic body 168 and a pair of ignitor contacts 170 and 172. The ignitor contacts 170 and 172 are connected to respective wires of the electrical wire lead 164, through which the contacts are coupled to the capacitor discharge unit 160. The capacitor discharge unit 160 provides sufficient electrical discharge to trigger ignition in the crucible assembly. Further details regarding a suitable electrical discharge unit may be found in European Patent Publication No. 875 330 and in co-pending U.S. application Ser. No. 08/846,285, both of which are incorporated 15 herein by reference in their entireties. The second end 70 of the ignitor 66 may be inserted into a slot 174 in the body 168, and between the contacts 170 and 172, putting the metal foil strips 90 and 92 (FIG. 4) into contact with respective of the contacts 170 and 172.

Figure 15:
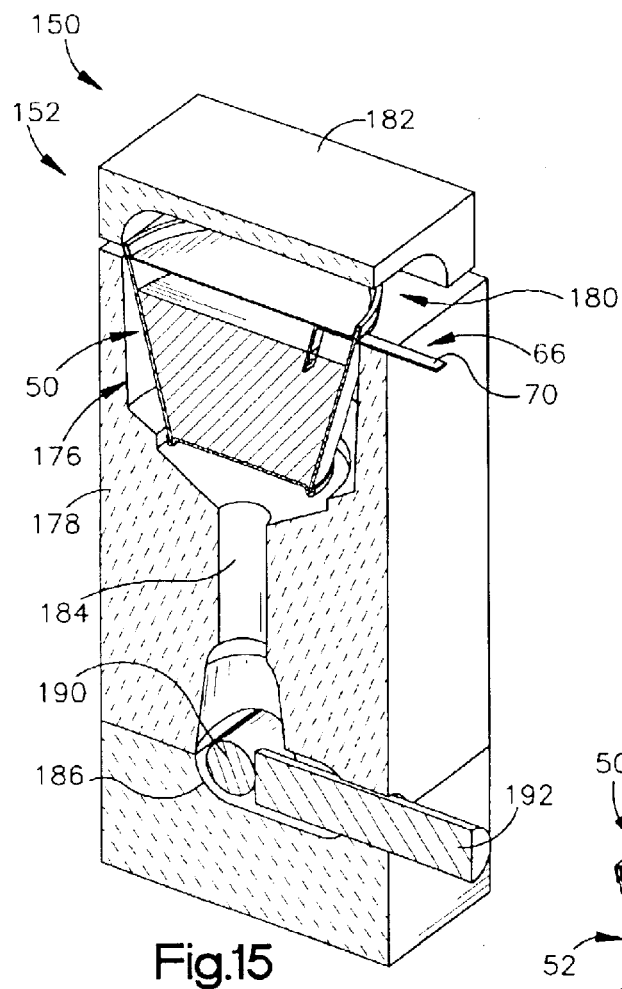
FIG. 15 is an isometric cutaway illustration of the crucible assembly of FIG. 2, in conjunction with a mold, as part of a welding apparatus.

Referring now to FIG. 15, the mold 152 may be a traditional split mold, similar to the mold 12 shown in FIG. 1 and described above. The crucible assembly 50 fits into a crucible chamber 176 of an upper mold body 178 of the mold 152, with the second end 70 of the ignitor 66 protruding from an opening 180 between the upper mold body 178 and a lid 182 of the mold 152. Thus the crucible assembly 50 does not required a specialized mold, but rather may be used with molds usable with prior welding systems. Upon ignition of the ignitor 66, the weld material 64 reacts to form a molten weld metal. The weld metal then melts or ruptures the fusible bottom 56 of the container 52. The weld metal then passes through a tap hole 184 and into a weld chamber 186, where the weld metal forms a weld connection between a pair of bars 190 and 192.

It will be appreciated that the ability to use the crucible assembly 50 in existing molds, such as the mold 152, increases versatility of the crucible assembly 50. Further, it will be appreciated that using the crucible assembly 50 with the mold 152, as opposed to using traditional bulk exothermic weld material powder in the crucible chamber 176, advantageously reduces the amount of cleaning required for the mold 152, thus reducing labor and costs, and extending mold life.

Figure 16:
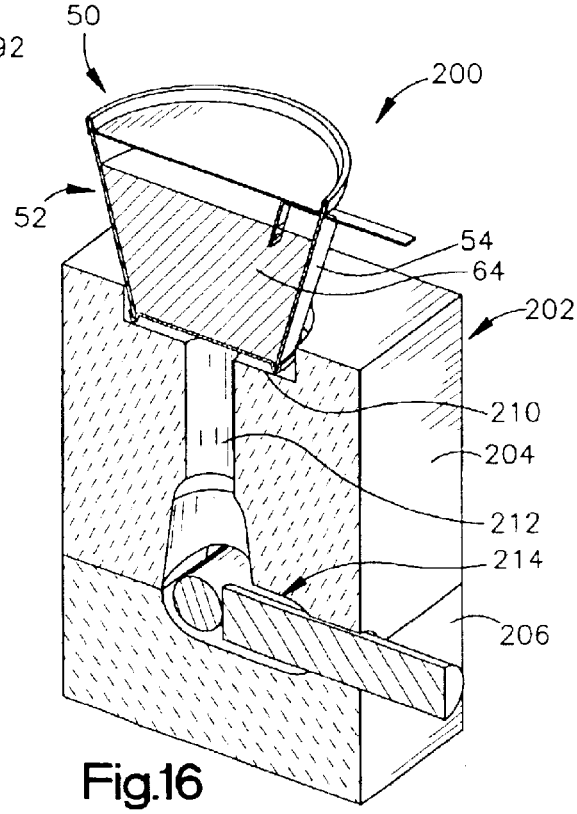
FIG. 16 is an isometric cutaway illustration of the crucible assembly of FIG. 2, in conjunction with another mold, as part of another welding apparatus.

FIG. 16 shows the crucible assembly 50 as part of another welding apparatus, a welding apparatus 200 that also includes a reduced-height mold 202. The mold 202 includes an upper mold body 204 and a lower mold body 206, both of which may be made of a suitable material such as graphite. The upper mold body 204 includes a seat or platform 210 to receive the bottom of the crucible assembly 50. A tap hole 212 transports molten weld metal from the crucible assembly 50 to a weld chamber 214, where a weld connection is formed.

Since the side walls 54 of the container 52 of the crucible assembly 50 themselves contain the reaction of the weld material 64, the upper mold body 204 need not include portions on the sides of and above the crucible assembly 50. Thus there is nothing in the upper mold body 204 corresponding to the crucible chamber 176 of the upper mold body 178 (FIG. 15). It will be appreciated therefore that the mold 202 represents an advantage over the mold 152, in terms of material used, machining time to produce, and cost.

Figure 17:
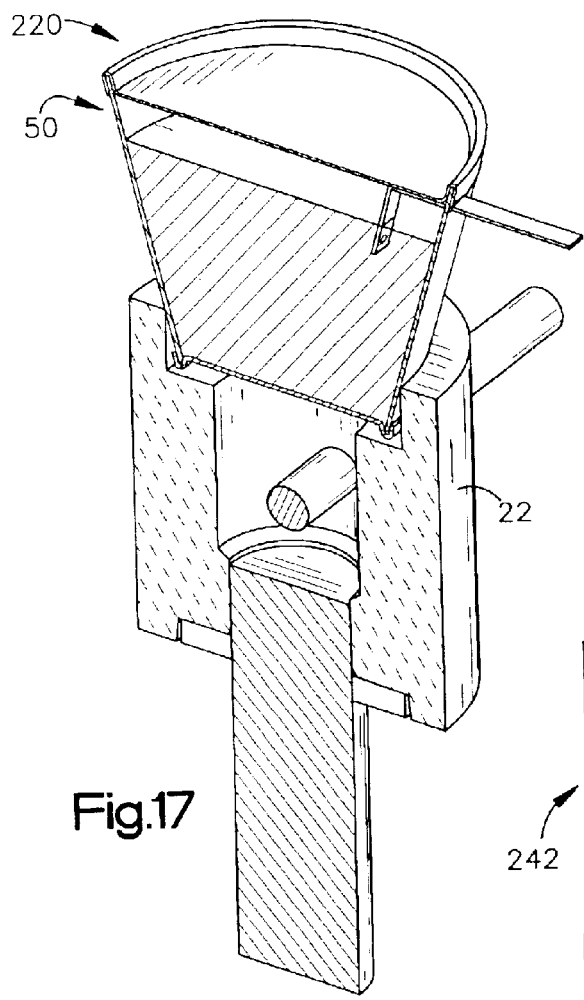
FIG. 17 is an isometric cutaway illustration of the crucible assembly of FIG. 2, in conjunction with yet another mold, as part of yet another welding apparatus.

FIG. 17 shows a welding apparatus 220 that includes the crucible assembly 50 and a ceramic mold 222. An example of a ceramic mold is the CADWELD® ONE-SHOT® available from ERICO.

Figure 18:
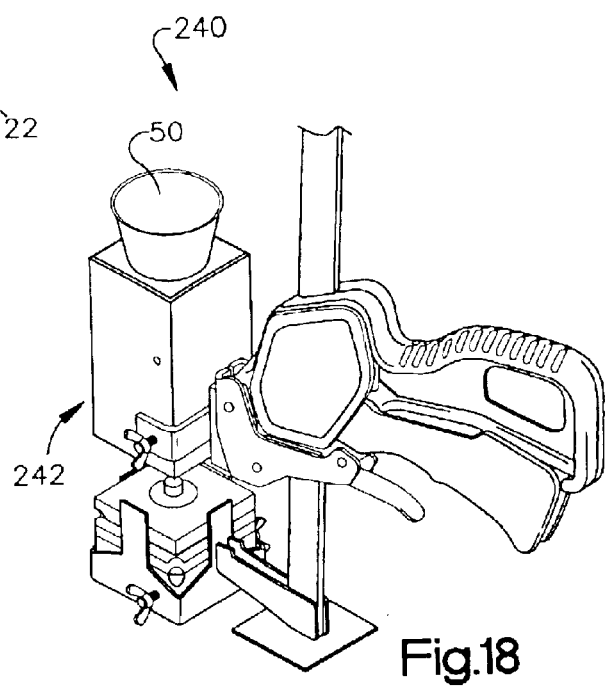
FIG. 18 is an isometric cutaway illustration of the crucible assembly of FIG. 2, in conjunction with still another mold, as part of still another welding apparatus.

In a welding apparatus 240, shown in FIG. 18, the crucible assembly 50 is used in conjunction with a versatile, configurable mold 242. An example of such a configurable mold 242 is the CADWELD® MULTI™ available from ERICO. Further details regarding the configurable mold 242 may be found in U.S. Provisional Application No. 60/303,572, which is incorporated herein by reference in its entirety.

Figure 19:
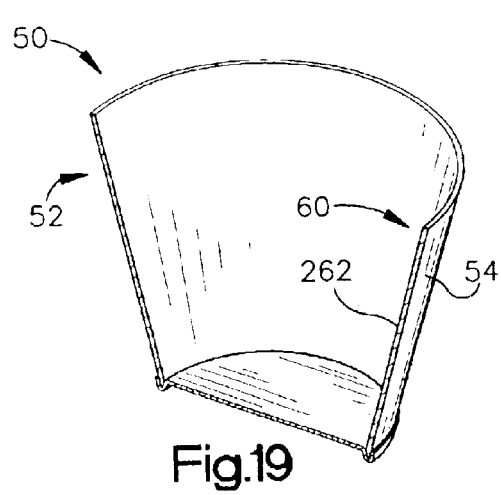
FIG. 19 is an isometric cutaway illustration of an alternate embodiment container usable with the crucible assembly of FIG. 2.

Turning now to FIG. 19, an alternative embodiment container 52 includes side walls 54 having a refractory material lining 60 which is a coating 262 on the side walls 54. The coating 262 may be, for example, a sprayed-on graphite coating. Another possible coating is a boron nitride coating.

Figure 20:
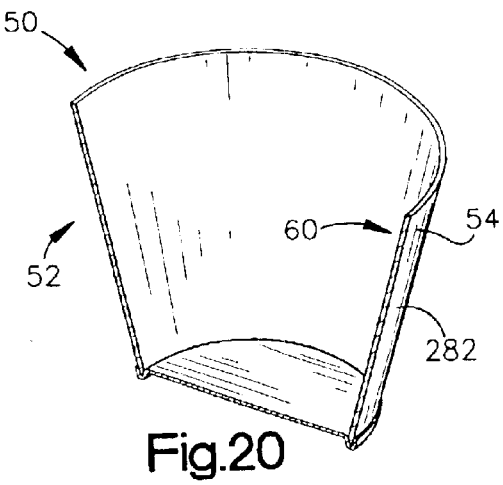
FIG. 20 is an isometric cutaway illustration of another alternate embodiment container usable with the crucible assembly of FIG. 2

FIG. 20 shows another embodiment container 52 in which side walls 54 and refractory material lining 60 are combined in a unitary refractory material piece 282. The unitary refractory material piece 282 may be, for example, a graphite piece of suitable thickness and strength. A graphite piece 282 may have a thickness of at least 50 mils.

Figure 21:
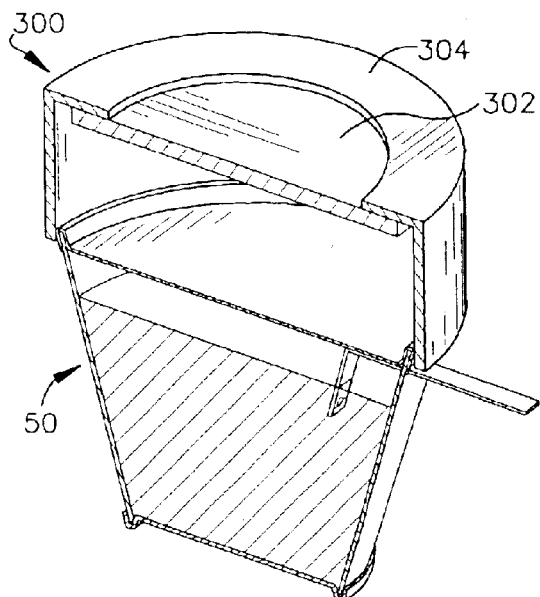
FIG. 21 is an isometric cutaway illustration of a welding apparatus which includes the crucible assembly of FIG. 2 and a filter assembly.

FIG. 21 shows the crucible assembly 50 in an alternate configuration that includes an add-on filter adapter 300. The filter adapter 300 includes a filter 302 and a baffle 304. The baffle 304 fits over the top of the crucible assembly 50. The filter 302 and the baffle 304 reduce expulsion of undesirable reaction products, such as particulate matter, into the atmosphere in the vicinity of the reaction of the weld material 64. The baffle includes holes therein which force upward-directed reaction products to pass through a torturous flow path. The baffle 304 may include a flame arrester, an extruded ceramic piece with many holes therein, which acts as a heat sink. It will be appreciated that the baffle may be employed without a filter, if desired.

Figure 22:
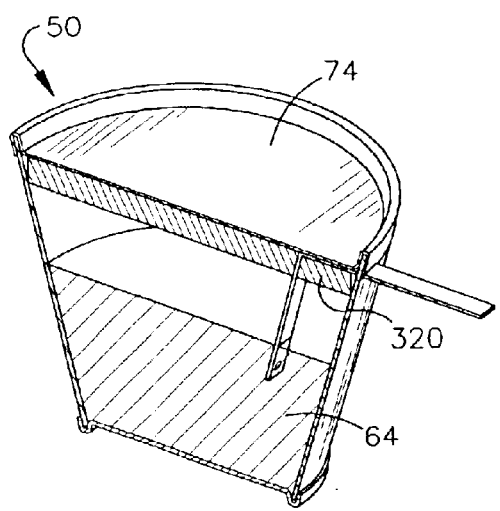
FIG. 22 is an isometric cutaway illustration of an alternate embodiment of the crucible assembly of FIG. 2, with an integrated filter.

Alternatively, it will be appreciated that a filter may be incorporated as integral part of the crucible assembly. Such an integrated system is shown in FIG. 22, wherein a crucible assembly 50 includes a filter 320 between weld material 64 and a cover 74. The filter 320 may be attached to the cover 74, for example being adhesively adhered to the cover 74.

The material for the filters 302 and 320 may by a ceramic or refractory blanket material. Examples of suitable materials are the materials sold under the trademarks FIBERFRAX, UNIFRAX, and DURABLANKET.

Figure 23:
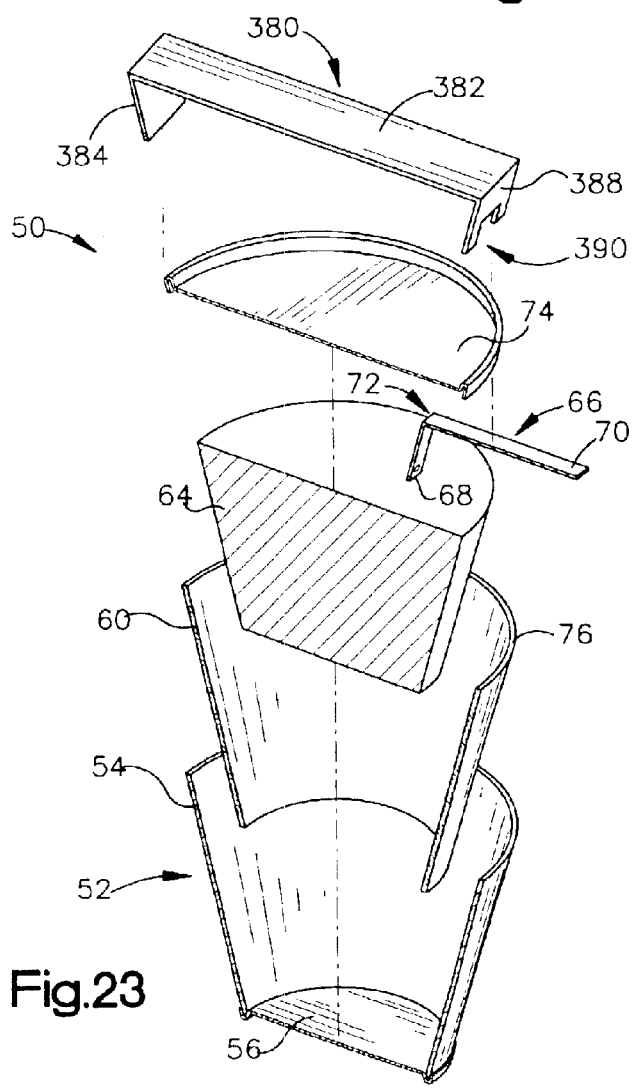
FIG. 23 is an exploded view of an alternate embodiment crucible assembly, with a retainer clip, according to the present invention.

FIG. 23 shows yet an alternative embodiment of the crucible assembly 50. The crucible assembly 50 shown in FIG. 23 may be similar to that shown in FIGS. 2 and 3, and described above, with the addition of a retainer clip 380 that is used to secure the position of the ignitor 66. The retainer clip 380 has a middle portion 382 and a pair of downward-bent side portions 384 and 388. The side portion 388 has a notch 390 therein. The retainer clip 380 fits over the cover 74, with the middle portion over the top opening of the container 52. The side portions 384 and 388 extend downward along the side walls 54 of the container 52, with the ignitor 66 fitting into the notch 390. The side portions 384 and 388 of the retainer clip 380 may then be crimped or otherwise secured along the side walls 54 of the container 52, thus holding the ignitor 66 in place.

The retainer clip 380 may be made of stainless steel, or of a variety of other suitable materials, such as suitable metals (including various types of steel), plastics, wire, or paper. One suitable material is ¼ hard stainless steel with a thickness of 0.005 inches (0.13 mm). Stainless steel has been found to be an advantageous material for the retainer clip 380, since stainless steel resists degradation in adverse wether conditions, and can withstand the high temperatures of the welding process.

The retainer clip 380 advantageously provides additional securement of the ignitor 66, which may be desirable for environments where the crucible assembly 50 may be subjected to rough handling which might otherwise displace the ignitor 66 from its desired location.

It will be appreciated that many suitable variants and applications are possible for the above-described devices. For example, it will be appreciated the devices may be used to form weld connections between different numbers of bars or other objects in any of a wide variety of configurations.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A self-contained crucible assembly comprising:
    a container having side walls and a fusible bottom;
    a refractory material lining the side walls of the container;
    an exothermic weld material within the container;
    an ignitor extending into the container for igniting the exothermic material; and
    a cover attached to the container;
    wherein the cover seals a top opening of the container, to thereby prevent ingress of contaminants into the weld material; and
    wherein the side walls of the container do not include the refractory material.

2. An ignitor for weld metal material comprising:
    first and second metal strips; and
    an insulating material between the first and second metal strips;
    wherein the first metal strip has a perforation therein operative to create a spark plasma emanating from the perforation when a voltage is applied to the first metal strip;
    wherein the second strip is stiffer than the first strip; and
    wherein the second metal strip is thicker than the first metal strip.

3. The crucible assembly of claim 1, wherein the side walls of the container include steel.

4. The crucible assembly of claim 3, wherein the fusible bottom and the side walls of the container are formed as a single piece.

5. The crucible assembly of claim 1, wherein the side walls of the container are combustible in the absence of the liner.

6. The crucible assembly of claim 5, wherein the side walls of the container include a paper pulp material.

7. The crucible assembly of claim 6, wherein the fusible bottom of the container is a metal disk attached to the side walls of the container.

8. The crucible assembly of claim 7, wherein the metal disk is crimped onto the side walls of the container.

9. The crucible assembly of claim 1, wherein the side walls of the container include a ceramic material.

10. The crucible assembly of claim 1, wherein the refractory material is a separate liner inserted within the side walls of the container.

11. The crucible assembly of claim 1, wherein the refractory material includes a lining sprayed onto the side walls of the container.

12. The crucible assembly of claim 1, wherein the side walls of the container include a conical surface.

13. The crucible assembly of claim 1, wherein the fusible bottom of the container is a separate piece attached to the side walls of the container.

14. The crucible assembly of claim 1, wherein the fusible bottom of the container includes a metal disk.

15. A self-contained crucible assembly comprising:
    a container having side walls and a fusible bottom;
    a refractory material lining the side walls of the container;
    an exothermic weld material within the container;
    an ignitor extending into the container for igniting the exothermic material; and
    a cover attached to the container;

wherein the cover seals a top opening of the container, to thereby prevent ingress of contaminants into the weld material;

wherein the side walls of the container and the refractory material are an integrally formed refractory material piece; and wherein the refractory material includes graphite.

16. The crucible assembly of claim 1, wherein the refractory material includes graphite.

17. The crucible assembly of claim 1, wherein the refractory material is a graphite foil.

18. The crucible assembly of claim 17, wherein the graphite foil has a thickness of at least about 10 mils.

19. The crucible assembly of claim 1, wherein the cover is configured to rupture during reaction of the weld metal material.

20. The crucible assembly of claim 1, wherein the cover is a metallized plastic film.

21. The crucible assembly of claim 20, wherein the cover is sealingly attached to the container along a perimeter of the top opening.

22. The crucible assembly of claim 20, wherein the metallized plastic film includes an aluminized plastic film.

23. The crucible assembly of claim 20, wherein the metallized plastic film has a thickness from about 0.5 mils to about 2 mils.

24. The crucible assembly of claim 20, wherein the cover is configured to rupture during reaction of the weld material.

25. The crucible assembly of claim 1, wherein the ignitor passes between the metal cover and the container, thereby allowing an external portion of the ignitor to protrude from the container.

26. The crucible assembly of claim 25, wherein the ignitor is secured to the cover.

27. The crucible assembly claim 26, wherein the ignitor is glued to the cover.

28. The crucible assembly of claim 1, wherein the ignitor includes a metal strip with a perforation therein operative to create a spark plasma across the perforation when a voltage is applied to the metal strip.

29. The crucible assembly of claim 28, wherein the metal strip is a metal foil strip.

30. The crucible assembly of claim 29, wherein the metal foil strip is a copper strip.

31. The crucible assembly of claim 28, wherein the metal strip is a first metal strip, and further comprising a second metal strip coupled to the first metal strip with an insulating material therebetween.

32. The crucible assembly of claim 31, wherein the perforation passes through the insulating material and passes at least through the second metal strip.

33. The crucible assembly of claim 31, wherein the perforation is generally conical in shape.

34. The crucible assembly of claim 31, wherein the perforation has a larger diameter at the first metal strip than at the second metal strip.

35. The crucible assembly of claim 31, wherein the first and second metal strips are made of the same metal.

36. The crucible assembly of claim 35, wherein the first and second metal strips are made of copper.

37. The crucible assembly of claim 31, wherein the first and second metal strips are made of different metals.

38. The crucible assembly of claim 37, wherein the first metal strip is made of copper.

39. The crucible assembly of claim 38, wherein the second metal strip is made of steel.

40. The crucible assembly of claim 39, wherein the second metal strip is thicker than the first metal strip.

41. The crucible assembly of claim 31, wherein the second metal strip is stiffer than the first metal strip.

42. The crucible assembly of claim 31, wherein the second metal strip is stronger than the first metal strip.

43. The crucible assembly of claim 28, wherein the perforation creates an opening less than 2 mm in any dimension.

44. The crucible assembly of claim 1, further comprising a filter operatively coupled to the top opening of the container.

45. The crucible assembly of claim 44, wherein the filter is between the weld metal material and a cover that covers the top opening of the container.

46. The crucible assembly of claim 44, wherein the filter is attached to a baffle placed over the top opening of the container.

47. The crucible assembly of claim 1, wherein the weld material is an exothermic material that includes a reductant metal and a transition metal oxide.

48. The crucible assembly of claim 47, wherein the weld material includes aluminum and copper oxide.

49. The crucible assembly of claim 1, wherein the crucible assembly has a flat bottom.

50. The crucible assembly of claim 49, wherein the flat bottom has a disk shape.

51. The crucible assembly of claim 50, wherein the flat bottom is a metal disk that serves, when fused, in part as metal weld material.

52. The crucible assembly of claim 1, in combination with a mold having a chamber therein for formation of a weld between two pieces of metal.

53. The crucible assembly of claim 1, further comprising a retainer clip secured to the container;

wherein the retainer clip secures the ignitor in place relative to the container.

54. The crucible assembly of claim 53, wherein the retainer clip fits over the top opening of the container.

55. The crucible assembly of claim 54, wherein the retainer clip is secured to the side walls of the container.

56. The crucible assembly of claim 55, wherein side portions of the retainer clip are crimped.

57. The crucible assembly of claim 53, wherein the retainer clip includes a notch into which the ignitor is placed.

58. The crucible assembly of claim 53, wherein the retainer clip is made of stainless steel.

59. The ignitor of claim 2, wherein the first metal strip is a metal foil strip.

60. The ignitor of claim 59, wherein the metal foil strip is a copper strip.

61. The ignitor of claim 2, wherein the perforation passes through the insulating material and passes at least through the second metal strip.

62. The ignitor of claim 2, wherein the perforation is generally conical in shape.

63. The ignitor of claim 2, wherein the perforation has a larger diameter at the first metal strip than at the second metal strip.

64. The ignitor of claim 2, wherein the first and second metal strips are made of the same metal.

65. The ignitor of claim 64, wherein the first and second metal strips are made of copper.

66. An ignitor for weld metal material comprising:

first and second metal strips; and an insulating material between the first and second metal strips;

wherein the first metal strip has a perforation therein operative to create a spark plasma emanating from the perforation when a voltage is applied to the first metal strip;

wherein the second strip is stiffer than the first strip; and wherein the first and second metal strips are made of different metals.

67. The ignitor of claim 66, wherein the first metal strip made of copper.

68. The ignitor of claim 67, wherein the second metal strip is made of steel.

69. The ignitor of claim 68, wherein the second metal strip is thicker than the first metal strip.

70. The ignitor of claim 2, wherein the perforation creates an opening less than 2 mm in any dimension.

71. The crucible assembly of claim 15, wherein the graphite of the refractory material is at least 50 mils thick.

72. The crucible assembly of claim 15, wherein the cover is configured to rupture during reaction of the weld metal material; and wherein the cover is a metallized plastic film.

73. The ignitor of claim 68, wherein the perforation passes through the insulating material and passes at least through the second metal strip.

74. The ignitor of claim 68, wherein the perforation is generally conical in shape.

75. The ignitor of claim 68, wherein the perforation has a larger diameter at the first metal strip than at the second metal strip.

* * * * *